United States Patent
Tsai

(10) Patent No.: US 7,381,044 B2
(45) Date of Patent: Jun. 3, 2008

(54) MOLDING APPARATUS WITH OPTICAL ALIGNMENT MECHANISM

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,814

(22) Filed: Oct. 3, 2006

(65) Prior Publication Data

US 2007/0218157 A1  Sep. 20, 2007

(51) Int. Cl.
*B29C 33/30* (2006.01)

(52) U.S. Cl. .................... 425/169; 425/150; 425/450.1

(58) Field of Classification Search ................. 425/169, 425/150, 450.1, 195, 193
See application file for complete search history.

(56) References Cited

U.S. PATENT DOCUMENTS

| | | | | |
|---|---|---|---|---|
| 4,777,475 | A * | 10/1988 | Mita et al. .................. | 340/540 |
| 4,998,274 | A * | 3/1991 | Ephraim ..................... | 379/158 |
| 5,762,977 | A | 6/1998 | Boskovic | |
| 5,914,074 | A * | 6/1999 | Martin et al. .............. | 264/1.38 |
| 6,197,227 | B1 * | 3/2001 | Appleton et al. ........... | 264/1.1 |
| 6,315,543 | B1 * | 11/2001 | Lausenhammer et al. ... | 425/139 |
| 6,416,307 | B1 * | 7/2002 | Buazza et al. .............. | 425/143 |
| 6,669,460 | B1 * | 12/2003 | Tai et al. .................... | 425/193 |
| 6,997,428 | B1 * | 2/2006 | Andino et al. .............. | 249/134 |
| 2005/0179148 | A1 * | 8/2005 | Tridon et al. .............. | 264/1.32 |
| 2005/0271767 | A1 | 12/2005 | Kruidering | |
| 2006/0121154 | A1 * | 6/2006 | Manning ..................... | 425/564 |
| 2007/0035056 | A1 * | 2/2007 | Suehira et al. ............. | 264/40.1 |

FOREIGN PATENT DOCUMENTS

JP    2005154201 A  *  6/2005

* cited by examiner

*Primary Examiner*—James Mackey
*Assistant Examiner*—Seyed Masoud Malekzadeh
(74) *Attorney, Agent, or Firm*—Jeffrey T. Knapp

(57) ABSTRACT

A molding apparatus includes a first mold part, a second mold part, and an alignment assembly. The two mold parts have an alignment axis and are configured for mating with each other to delimit molding cavity. The two mold parts respectively have a first surface and a second surface, which face each other. The alignment assembly is associated with the two mold parts and includes a light emitting member and a light receiving member. The two members are linked to the two mold parts, respectively. The light emitting member is configured for delivering light to a first location of the first surface at a predetermined position relative the alignment axis. The light receiving member is configured for receiving the light emitted at a second location of the second surface, at a same position relative the alignment axis as the first location.

13 Claims, 5 Drawing Sheets

MOLDING APPARATUS WITH OPTICAL ALIGNMENT MECHANISM

FIELD OF THE INVENTION

The present invention relates to molding apparatuses and, more particularly, to a molding apparatus having an alignment assembly for accurately aligning mold halves of the molding apparatus.

DESCRIPTION OF RELATED ART

Molding apparatuses are critical to modern industry. For example, the molding apparatuses are widely used to manufacture various kinds of precision components such as, aspheric glass lenses, semiconductor chips, compact discs, etc. One set of designed molding apparatuses can be used many thousands of times to manufacture thousands of products.

A typical molding apparatus includes two mold parts or halves. The two mold parts are brought together (i.e., closed) to define a molding cavity, and material is injected into the cavity to form a product. During the molding process, the two mold parts are repeatedly opened and closed to facilitate the formation of multiple products. Molding processes are used in many industries. In many of these industries, the products being formed must meet rigorous standards and specifications. Hence, the tolerance for misalignment between the two mold parts during the molding process is generally small.

Alignment devices are used to reduce tolerances between the two mold parts in order to accurately form products that meet the appropriate standards and specifications for each industry. A typical alignment device comprises a first member attached to one of the two mold parts and a second member attached to the other mold part. The first member has a male portion that engages with a female portion of the second member when the two mold parts are closed together.

The male portion of the first member includes a first pair of bearing surfaces and the female portion of the second member includes a second pair of bearing surfaces. The bearing surfaces of the male portion slide against the bearing surfaces of the female portion to provide a fit therebetween when aligning and guiding the mold parts together. The fit between the male and female portions of the first and second members determines the magnitude of misalignment between the mold parts. Due to frequently alignment operations of the alignment device, these bearing surfaces are themselves subject to repetitious mechanical abrasion and thereby are prone to wear. Such wear can adversely influence the degree of precision that can be ensured by such an alignment device, and the abraded surfaces can actually slow the cycle time of the molding device due to friction, resulting in fewer cycles in a given time frame. As such, such wear necessitates the regular replacement of the alignment device.

Furthermore, as demand for higher productivity increases, the speed of the molding process increases, thereby accelerating the abrasion along the bearing surfaces of the alignment devices. The added abrasion along the bearing surfaces further exacerbates the wear problem, thereby significantly decreasing the cycles of operation over a given time period for the alignment device.

What is needed, therefore, is a molding apparatus that have a relatively accurate alignment assembly capable of operating for long cycles and that does not contribute friction that can impede the cycle time of the molding apparatus.

SUMMARY OF INVENTION

In accordance with a preferred embodiment, a molding apparatus includes a first mold part, a second mold part, and an alignment assembly. At least one of the first and second mold parts has an alignment axis. The first and second mold parts are configured (i.e., structured or arranged) for mating with each other together to define at least one molding cavity. The first and second mold parts respectively have a first surface and a second surface, the second surface facing toward the first surface. The alignment assembly is associated with the first and second mold parts. The alignment assembly includes a light emitting member and a light receiving member. The light emitting member is operatively associated/linked with the first mold part. The light emitting member is configured (i.e., structured or arranged) for emitting light at a first location of the first surface at a predetermined distance from the alignment axis. The light receiving member is operatively associated/linked with the second mold part. The light receiving member is configured (i.e., structured or arranged) for receiving the light emitted at a second location of the second surface. The second location is positioned at a same distance and angle from the alignment axis, as is the first location.

Other advantages and novel features will be drawn from the following detailed description of preferred embodiments when conjunction with the attached drawings.

BRIEF DESCRIPTION OF THE DRAWINGS

Many aspects of the present molding apparatus can be better understood with reference to the following drawings. The components in the drawings are not necessarily drawn to scale, the emphasis instead being placed upon clearly illustrating the principles of the present molding apparatus. Moreover, in the drawings, like reference numerals designate corresponding parts throughout the several views.

DETAILED DESCRIPTION

Embodiments of the present molding apparatus will now be described in detail below and with reference to the drawings.

Figure 1:
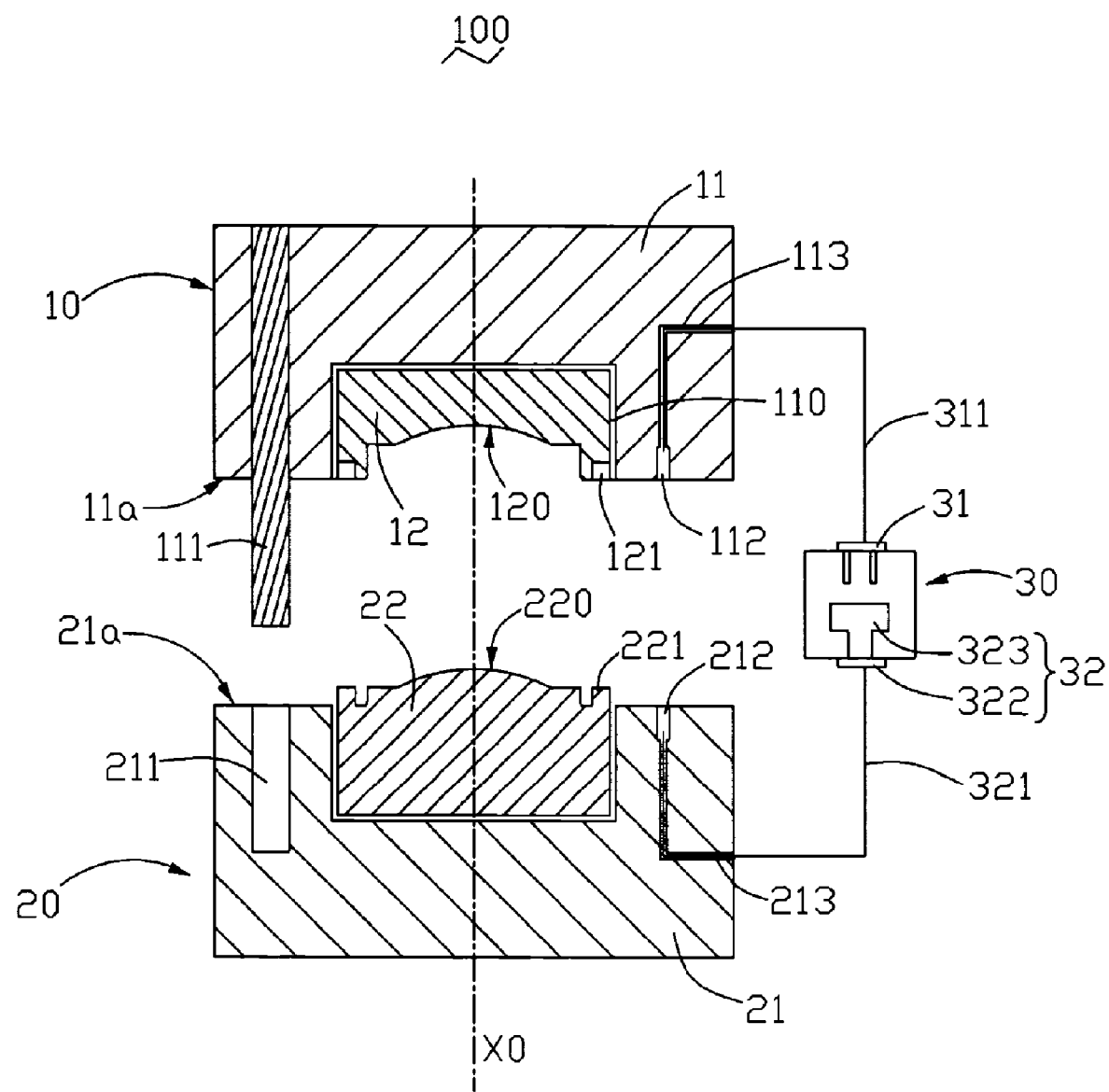
FIG. 1 is a schematic, cross-sectional view of a molding apparatus, according to a preferred embodiment, having two mold parts, showing the two hold parts separated from each other.

FIG. 1 illustrates a molding apparatus 100, in accordance with a preferred embodiment. The molding apparatus 100 includes a first mold part 10, a second mold part 20, and an alignment assembly 30. The first and second mold parts 10, 20 are aligned with respect to an alignment axis X0 when molding a component. The first and second mold parts 10, 20 are selectably movable (both toward and away from one another) and separable from each other. Optionally, the second mold part 20 is stationary and the first mold part 10 is movable with respect to the second mold part 20 during molding process. In this situation, the alignment axis X0 could be, e.g., a center axis of the second part 20.

The first mold part 10 includes a first mold base 11 and a first mold core 12. The first mold base 11 has a first surface 11a defining a receiving cavity 110 thereat. The first mold core 12 is received in the receiving cavity 110. The first mold core 12 has a first molding face 120 and defines a plurality of locating grooves 121 at edges thereof. A guide pole 111 is inserted into the first mold part 10 and extends out of (i.e., beyond) the first surface 11a.

The second mold part 20 has a structure mating with the first mold part 10. For example, the second mold part 20 includes a second mold base 21 and a second mold core 22, respectively configured (i.e., structured and arranged) for mating with the first mold base 11 and the first mold core 12 along the alignment axis X0. The second mold core 22 has a second molding face 220 configured (i.e., structured and arranged) for mating with the first molding face 120 of the first mold core 12 along the alignment axis X0. The first and second molding faces 120, 220 cooperatively define/delimit a molding cavity when the first and second mold parts 11, 21 are mated together along the alignment axis X0. The second mold base 21 defines a guide groove 211 configured for receiving the guide pole 111. A plurality of locating pins 221 extends outwardly from edges of the mold core 22 for mating with the locating grooves 121.

The first and second surfaces 11a, 21a of the first and second mold bases 11, 21 have defined therein a pair of orifices 112, 212 at two corresponding predetermined locations thereof. The two predetermined locations are positioned/oriented at a same distance and same relative angle with respective to the alignment axis X0. That is, the two orifices 112, 212 are equidistant equivalently spaced, radially and circumferentially, from the alignment axis X0. Thus, the two orifices 112, 212 are aligned when mating the first and second mold parts 11, 21 together along the alignment axis X0. The first and second mold bases 11, 21 define two channels 113, 213, respectively. The two channels 113, 213 extend from orifice bottoms of the two orifices 112, 212 to outside of the first and second mold bases 11, 21, respectively. In the illustrated embodiment, the two channels 113, 213, respectively, extend inwardly, parallel to the alignment axis X0, from the two orifices 112, 212 into the first and second mold bases 11, 21, for a predetermined distance. Then, at the predetermined distance, the two channels 113, 213 extend outwardly to communicate with outside of the respective first and second mold bases 11, 21.

The alignment assembly 30 is positioned in a vicinity of the first and second mold bases 11, 21. The alignment assembly 30 includes a light emitting member 31 and a light receiving member 32, connected to the first and second mold parts 11, 21, respectively. The light emitting and receiving members 31, 32 have light transmission cables 311, 321, respectively. The two light transmission cable 311, 321 are connected to the two orifices 112, 212 through the two channels 113, 213, respectively. As such, the light emitting member 31 is operatively associated with the orifice 112, while the light receiving member 32 is functionally linked with the orifice 212.

The light emitting member 31 has a light source, such as, for example, a laser source or a light emitting diode. The light transmission cables 311, 321 can be, e.g., an optical fiber or an optical cable. The light receiving member 32, as shown, includes a photoelectric conversion circuit 322 and an analog-digital conversion circuit 323 electrically connected to the photoelectric conversion circuit 322, but it is recognized that any combination of elements that facilitates the conversion of an optical signal into an electronic signal could potentially be employed. The light transmission cables 311, 321 are optically coupled, respectively, to the light source of the light emitting member 31 and to the photoelectric conversion circuit 322 of the light receiving member 32. The light source of the light emitting member 31, the photoelectric conversion circuit 322, and the analog-digital conversion circuit 323 can, for example, be integrally assembled within a body of the alignment assembly 30, as shown in FIG. 1, but such integral assembly is not necessarily required. The integral assembly is, however, advantageous in that it promotes compactness, including in the related control/power circuitry.

Alternatively, the light emitting member 31 could be connected to the second mold part 21 and the light receiving member 32 could be connected to the first mold part 11. Also, alternatively, the light emitting and receiving members 31, 32 could be attached to the first and second mold parts 11, 21, respectively.

Figure 2:
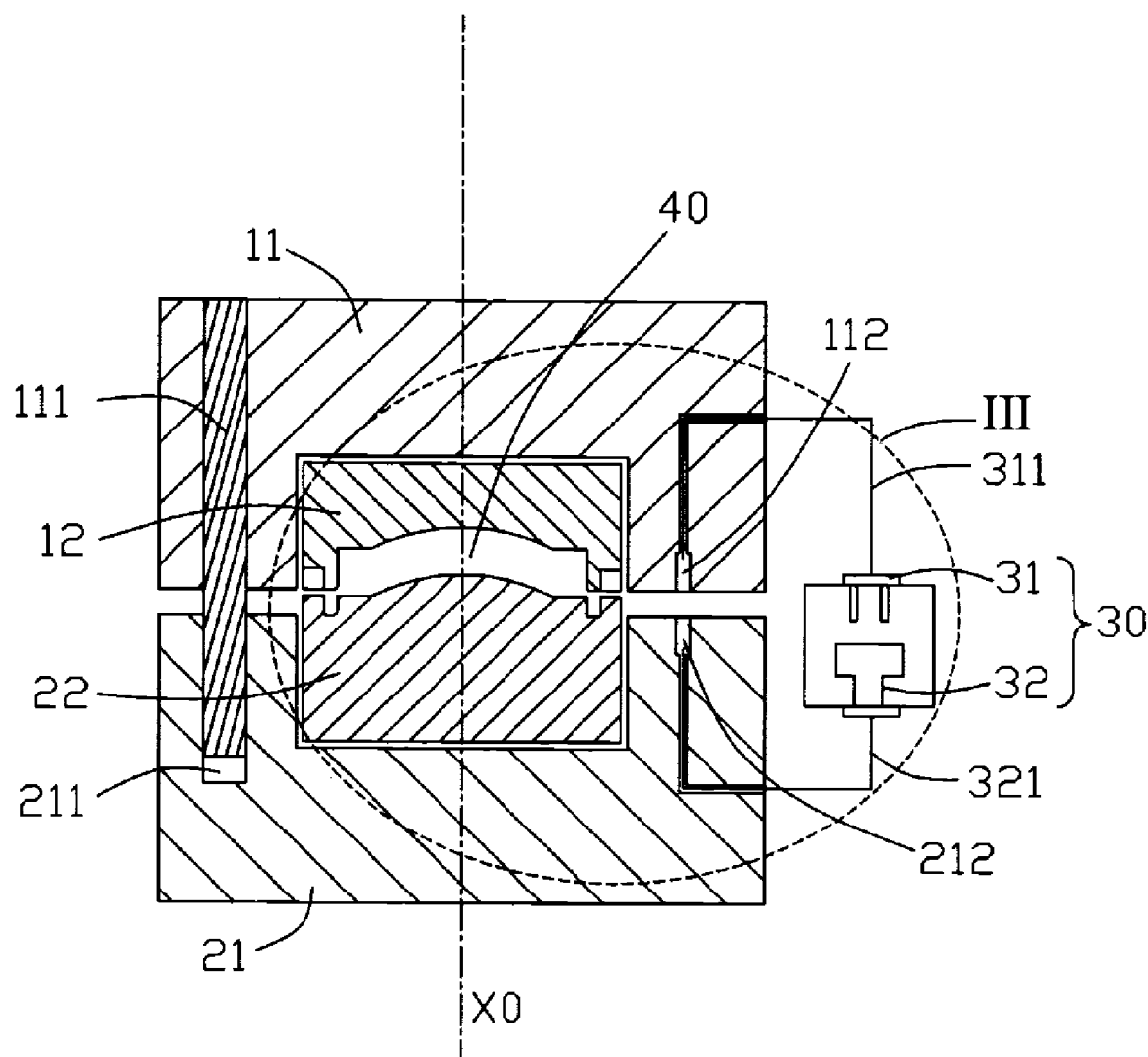
FIG. 2 is similar to FIG. 1, but showing the two hold parts mated together.
Figure 3:
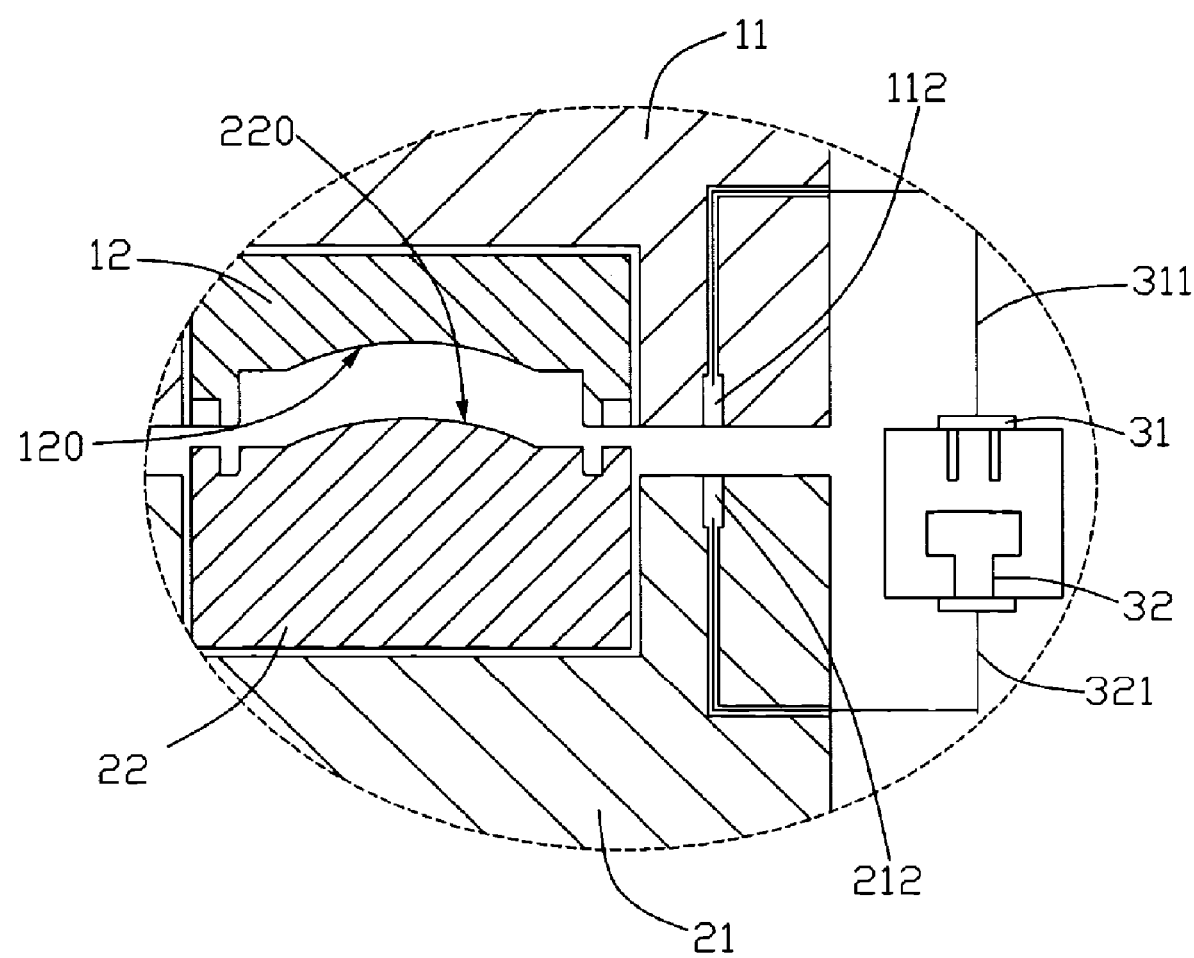
FIG. 3 is an enlarged, schematic view of section III of FIG. 2.

Referring to FIGS. 2 and 3, the two mold parts 11, 21 of the molding apparatus 100 are mated together via the sliding of the guide pole 111 into the guide groove 211. The first mold core 12 is aligned with the second mold core 22 along the alignment axis X0. In this situation, the two orifices 112, 212 are coaxially aligned with respect to each other, as shown in FIG. 3. When the light emitting member 31 emits light, the light emitted is transmitted to the orifice 112 via the light transmission cable 311 and accurately irradiates toward the orifice 212. The light receiving member 32 can, in this alignment position, receive light having a light intensity substantially similar to that of the light emitted from the light emitting member 31, via the light transmission cable 321. The light received is then converted into electrical analog signals in the photoelectric conversion circuit 322. The electrical analog signals are sequentially inverted into digital signals in the analog-digital conversion circuit 323.

Accordingly, the alignment degree of the molding apparatus 100 can be determined by reading the digital signals. The value of digital signals depends on the alignment degree of the molding apparatus 100, i.e., the misalignment or displacement degree of the two orifices 112, 212. The value precision of digital signals depends on the opening area of the two orifices 112, 212. In FIGS. 2 and 3, the two orifices 112, 212 are in an accurate alignment status. The digital signals correspondingly indicate the largest value possible.

Figure 4:
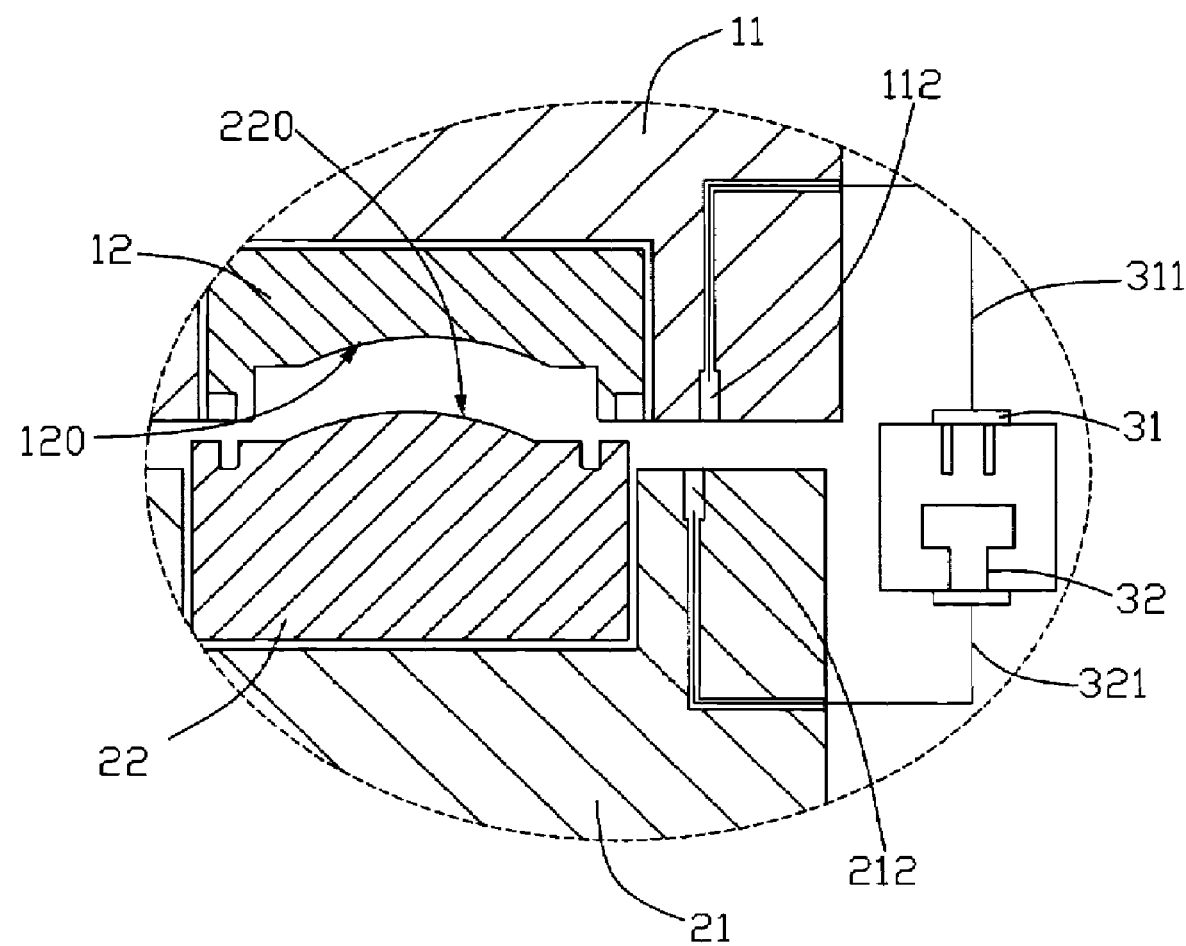
FIG. 4 is similar to FIG. 3, but showing the two mold parts being misaligned with respect to each other.

Referring to FIG. 4, the two mold parts 11, 21 of the molding apparatus 100 are also mated together via the sliding of the guide pole 111 into the guide groove 211. Nevertheless, the first mold core 12 is not accurately aligned with the second mold core 22 along the alignment axis X0. In this situation, the two orifices 112, 212 are partially misaligned with respect to each other. Thus, the light receiving member 32 receives only a portion of the light emitted from the light emitting member 31 and, as such, the received light has a relatively weak light intensity, in relation to that emitted by the light source. The analog-digital conversion circuit 323 thereby indicates a relatively small intensity value, in comparison with the largest possible value. The intensity value fraction can be expressed as $(I_o - I_r)/I_o$, where I=intensity, o=light output, and r=light received. This intensity value fraction can be used to determine if the degree of alignment is sufficient for a given molding situation. It is understood that the minimum required value would be dependent upon the degree of precision/accuracy needed in a given molding operation.

As such, according to the value of the digital signals, the alignment status of the molding apparatus 100 can be determined via the alignment assembly 30. Since the value of the digital signals depends on the alignment status of the molding apparatus 100, the alignment assembly 30 can also indicate the misalignment degree of the molding apparatus 100. The molding apparatus 100 can be adjusted to the accurate alignment status by moving the first mold part 11 at a calculated distance according to the indication of the alignment assembly 30. It is further understood that two or more such alignment apparatuses 30 could be employed at different relative locations within the molding apparatus 100, in order to better ensure the alignment of the first mold part 11 and the second mold part 21.

Figure 5:
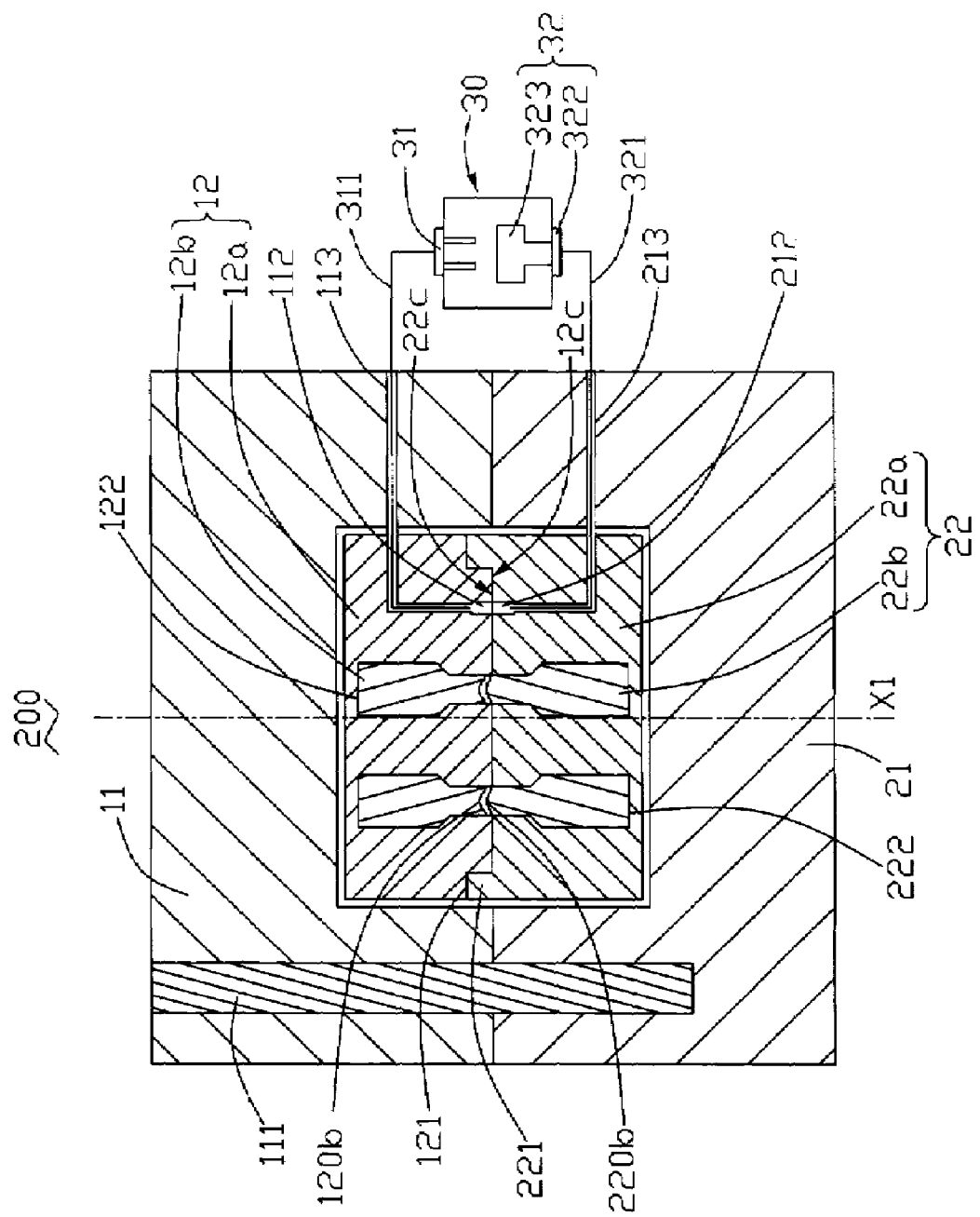
FIG. 5 is a schematic, cross-sectional view of an alternative molding apparatus, according to another preferred embodiment.

FIG. 5 illustrates another alternative molding apparatus 200, in accordance with another preferred embodiment. The molding apparatus 200 is essentially similar to the molding apparatus 100 except with respect to the mold cores 12 and 22. The mold cores 12/22 include mold blocks 12a/22a and a plurality of inserters 12b/22b, respectively. The mold blocks 12a, 22a define a plurality of sockets 122, 222, for accommodating the plurality of inserters 12b and 22b therein, respectively. Each of the inserters 12b in the mold block 12a is coaxially aligned with one respective inserter 22b in the mold block 22a. The two inserters 12b and 22b, coaxially aligned, define a pair of molding faces 120b and 220b. The two molding faces 120b and 220b are configured (i.e., structured or arranged) for delimiting/defining a molding cavity 40 for a predetermined component (e.g., an optical component) when mating them together along the alignment axis X1.

Each pair of molding faces 120b and 220b can have same structures and shapes, thereby molding a plurality of components at one time. Alternatively, each pair of molding faces 120b and 220b can have special structures and shapes different from other pairs of molding faces, for molding a respective special component, for example, an aspheric lens, an ultraviolet cut filter, or a spacer. Accordingly, various kinds of components can be simultaneously molded in the molding apparatus 200.

In the illustrated embodiment, the two orifices 112 and 212 are defined in two inner surfaces 12c and 22c of the mold blocks 12a and 22a, respectively. The channels 113/213 are in communication with the orifices 112/212 and are defined in the mold blocks 12a/22a and the mold bases 11/21, respectively. Alternatively, similar to the molding apparatus 100, the two orifices 112 and 212 can also be defined in the mold bases 11 and 21, respectively. The two channels 113, 213 are defined in the mold bases 11 and 21, respectively.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A molding apparatus comprising:
    a first mold part comprising a first mold base and a first mold core, the first mold base defining a first receiving cavity, the first mold core being received in the first receiving cavity, a first surface defined at the first mold base;
    a second mold part comprising a second mold base and a second mold core, the second mold base defining a second receiving cavity, the second mold core being received in the second receiving cavity, second surface defined at the second mold base and facing toward the first surface, at least one of the first and second mold parts having an alignment axis, the first and second mold cores being configured for mating with each other to define at least one molding cavity; and
    at least one alignment assembly associated with the first and second mold parts, each alignment assembly comprising:
        a light emitting member operatively associated with the first mold base, the light emitting member being configured for emitting light at a first location of the first surface at a predetermined distance from the alignment axis and at a given angular position relative thereto, the light emitting member comprising:
            a first light transmission cable optically linked to the first location of the first surface;
            a first orifice defined at the first location; and
            a first channel defined in the first mold base and extending inwardly from a bottom of the first orifice to an outside of the first mold base, the first channel being configured for directing the first light transmission cable to the first orifice; and
        a light receiving member operatively associated with the second mold base, the light receiving member being configured for receiving the light emitted at a second location of the second surface, the second location being oriented at a same distance from the alignment axis and at a same angular position relative thereto as the first location, the light receiving member comprising:
            a second light transmission cable optically linked to the second location of second surface;
            a second orifice defined at the second location; and
            a second channel defined in the second mold base and extending inwardly from a bottom of the second orifice to an outside of the second mold base, the second channel being configured for directing the second light transmission cable to the second orifice.

2. The molding apparatus as claimed in claim 1, wherein each of the first and second mold parts comprises a mold base defining a receiving cavity, a mold block received in the received cavity, and a plurality of inserters, each mold block defining a plurality of sockets for receiving the inserters therein, each inserter of the first mold part being configured for mating with a corresponding inserter of the second mold part to form a molding cavity.

3. The molding apparatus as claimed in claim 2, wherein the first and second surfaces are defined at respective ones of the two mold bases and the two mold blocks.

4. The molding apparatus as claimed in claim 2, wherein the mold cavities vary in space dimensions and in peripheral contours.

5. The molding apparatus as claimed in claim 1, wherein the two orifices have the same cross-sectional dimensions and are both oriented at a direction perpendicular to the alignment axis.

6. The molding apparatus as claimed in claim 1, wherein the two channels correspondingly extend from orifice bottoms of the two orifices to outside of the first and second mold bases, respectively.

7. The molding apparatus as claimed in claim 1, wherein the light receiving member comprises a photoelectric conversion circuit optically coupled with the light transmission cable thereof and an analog-digital conversion circuit electrically connected to the photoelectric conversion circuit.

8. The molding apparatus as claimed in claim 1, wherein each light transmission cable is one of an optical fiber and an optical cable.

9. The molding apparatus as claimed in claim 1, wherein the light emitting member comprises at least one light source of a laser source and a light emitting diode source.

10. A molding apparatus comprising:
   a fixed mold part having an alignment axis and comprising a first mold base and a first mold core, the first mold base defining a first receiving cavity, the first mold core being received in the first receiving cavity, a first surface being defined at the first mold base;
   a movable mold part comprising a second mold base and a second mold core, the second mold base defining a second receiving cavity, the second mold core being received in the second receiving cavity, a second surface being defined at the second mold base and facing toward the first surface, the first and second mold cores being configured for mating with each other together along the alignment axis to define at least one molding cavity;
   a light emitting member operatively associated with the first mold base, the light emitting member being configured for emitting light at a first location of the first surface at a predetermined distance from the alignment axis and at a given angular position relative thereto, the light emitting member comprising:
      a first light transmission cable optically linked to the first location of the first surface;
      a first orifice defined at the first location; and
      a first channel defined in the first mold base and extending inwardly from a bottom of the first orifice to an outside of the first mold base, the first channel being configured for directing the first light transmission cable of the light emitting member to the first orifice; and
   a light receiving member operatively associated with the second mold base, the light receiving member being configured for receiving the light emitted at a second location of the second surface, the second location being oriented at a same distance from the alignment axis and at a same angular position relative thereto as the first location, the light receiving member comprising:
      a second light transmission cable optically linked to the second location of second surface;
      a second orifice defined at the second location; and
      a second channel defined in the second mold base and extending inwardly from a bottom of the second orifice to an outside of the second mold base, the second channel being configured for directing the second light transmission cable of the light emitting member to the second orifice.

11. The molding apparatus as claimed in claim 10, wherein each of the first and second mold parts comprises a mold base defining a receiving cavity, a mold block received in the received cavity, and a plurality of inserters, each mold block defining a plurality of sockets for receiving the inserters therein, each inserter of the first mold part being configured for mating with a corresponding inserter of the second mold part to form a molding cavity.

12. The molding apparatus as claimed in claim 10, wherein the light receiving member comprises a photoelectric conversion circuit optically coupled with the light transmission cable thereof and an analog-digital conversion circuit electrically connected to the photoelectric conversion circuit.

13. The molding apparatus as claimed in claim 1, wherein the first channel extends inwardly parallel to the alignment axis from the first orifice into the first mold part in a predetermined distance and then extends outwardly to communicate with outside of the first mold part; the second channel extends inwardly parallel to the alignment axis from the second orifice into the second mold part in a predetermined distance and then extends outwardly to communicate with outside of the second mold part.

\* \* \* \* \*